(No Model.)
A. E. HAWES.
CRATE.
No. 415,362. Patented Nov. 19, 1889.
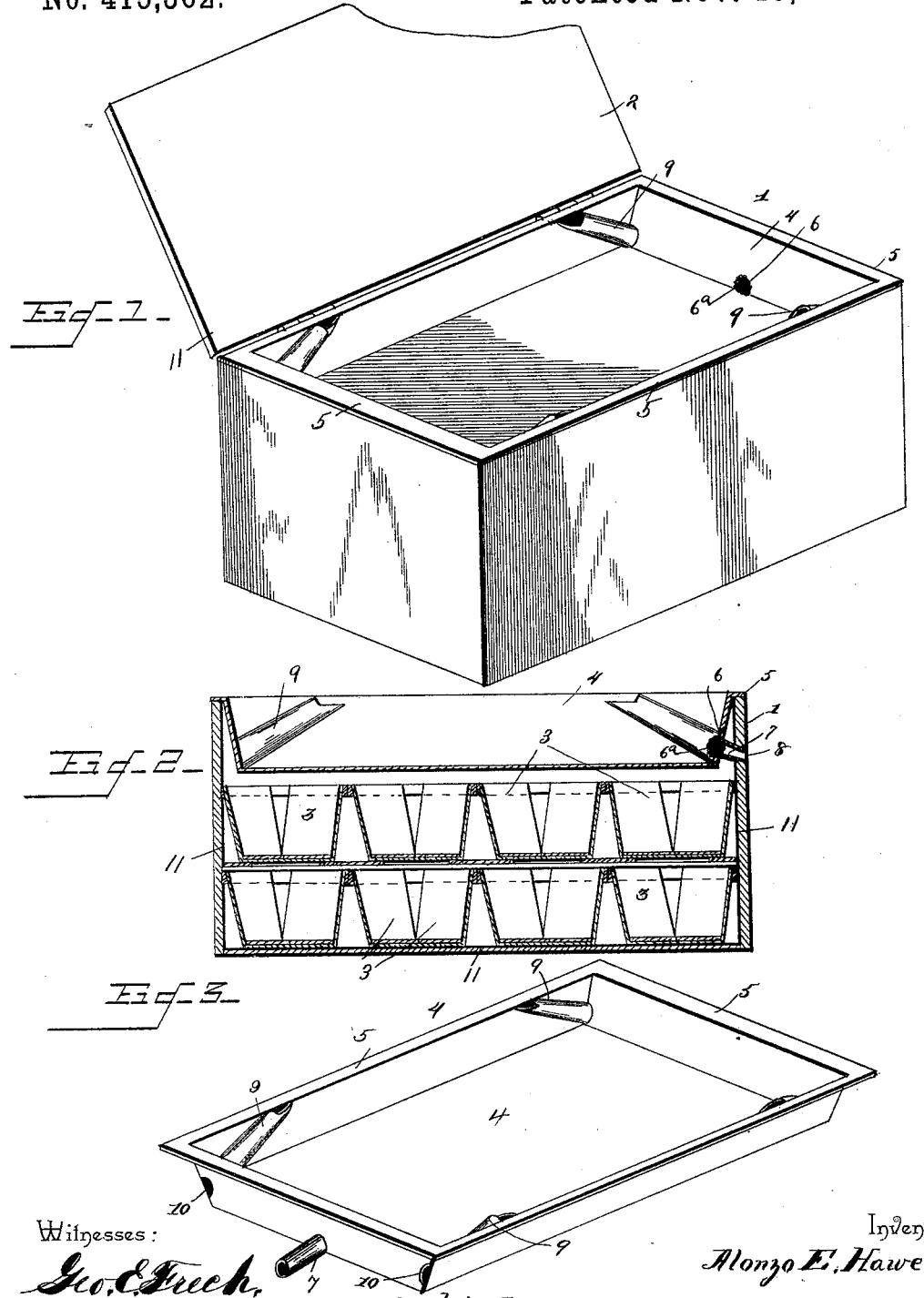
Witnesses:
Geo. E. Frech
W. J. Duvall
Inventor
Alonzo E. Hawes.
By his Attorneys,
C. A. Snow & Co.
N. PETERS, Photo-Lithographer, Washington, D. C.

UNITED STATES PATENT OFFICE.

ALONZO E. HAWES, OF PHILADELPHIA, PENNSYLVANIA.

CRATE.

SPECIFICATION forming part of Letters Patent No. 415,362, dated November 19, 1889.

Application filed August 8, 1889. Serial No. 320,151. (No model.)

*To all whom it may concern:*

Be it known that I, ALONZO E. HAWES, a citizen of the United States, residing at Philadelphia, in the county of Philadelphia and State of Pennsylvania, have invented a new and useful Crate, of which the following is a specification.

This invention has relation to crates for the transportation of perishable fruits, and among the objects in view is to provide a crate for this purpose adapted to prevent for a considerable period of time the perishing of fruit contained therein and while the same is transported.

The invention consists in the provision of a crate adapted for the reception of a series of tiers or layers of ordinary fruit baskets or boxes, and also for the superimposing of an ice-tank having suitable and novelly-arranged warm-air-conducting passages, whereby the heat rising from the lower portion of the crate is induced upwardly in a current and to the center of the ice chamber or tank and there cooled before a return passage.

Referring to the drawings, Figure 1 is a perspective of a crate constructed in accordance with my invention, the lid being thrown back. Fig. 2 is a longitudinal vertical section. Fig. 3 is a detail in perspective of the ice-chamber removed.

Like numerals of reference indicate like parts in all the figures of the drawings.

1 represents an ordinary rectangular crate, having a lid 2 hinged thereto and adapted to be locked in the ordinary manner. The crate, for the purpose of accommodating the ice-chamber, is preferably somewhat larger than those usually constructed, though, if preferred, I may construct the same of the ordinary size, but would thereby diminish the carrying capacity of the crate, and therefore prefer to construct the crate somewhat larger, as stated.

Within the crate I arrange in the usual manner the several tiers of fruit baskets or boxes 3, and over the same is mounted the ice tank or chamber 4. For the purpose of lightness, I prefer to form the ice-chamber 4 of galvanized sheet metal, and the same agrees in contour as to plan with that of the crate, and being of a size to depend within the walls of the crate and supported above the boxes 3 by means of lateral flanges 5, in which the upper edges of the walls of the tank terminate. At one end of the tank there is formed a drainage-port 6, having a stopper $6^a$, of sponge, and from the same extends a drainage-tube 7, the same terminating at its outer end in a small opening 8, formed in the end of the crate, and thus permitting a drainage of the ice-chamber. Each of the side walls of the ice-chamber is provided with inclined passages 9, the bottoms of which communicate with the interior of the crate below the ice-chamber by means of openings 10 cut in the bottoms. The upper ends of the passages 9 terminate slightly below the upper edge of the chamber, and the inclination of the passages are all toward the center of the chamber, or rather to the transverse center thereof, so that the warm air rising from the lower portion of the interior of the crate is divided into four currents and induced to rise through the passages and to meet directly above the ice-chamber at about its center, where it is efficiently cooled before its return by means of the ice contained in the chamber.

By practice I have found a crate thus constructed will transport berries and other perishable fruit long distances without any material damage to the same.

The interior of the crate and also the under surface of the cover or lid is preferably provided with any suitable lining, as 11, whereby the crate is rendered as near air-tight as possible, and thereby obviates as much as possible the consumption of ice.

Having described my invention, what I claim is—

1. The combination, with a crate adapted for the transportation of fruit and other perishable articles, of a depending ice-chamber mounted within the crate and at its upper end, said chamber being provided with lateral flanges lapping over the edges of the crate, and provided with a series of air-passages communicating with the crate below the chamber and with the chamber itself, substantially as specified.

2. The combination, with a crate adapted for the transportation of berries and other perishable articles, of a depending ice chamber or tank mounted in the upper end of the crate, and provided with a lateral supporting-flange overlapping the edge of the crate, and with opposite pairs of inclined air-passages formed in the side walls of the chamber or tank and communicating with the interior of the crate below the ice-chamber by means of openings formed in the bottom of said chamber, and having their upper ends communicating with the ice-chamber, said air-passages being oppositely inclined and disposed toward the transverse center of the ice-chamber, substantially as specified.

In testimony that I claim the foregoing as my own I have hereto affixed my signature in presence of two witnesses.

ALONZO E. HAWES.

Witnesses:
C. W. HAWES, Sr.,
A. E. THEODORE.